(12) United States Patent
Howell et al.

(10) Patent No.: US 7,921,044 B2
(45) Date of Patent: *Apr. 5, 2011

(54) SYSTEM AND METHODS FOR DISSEMINATING REAL TIME INFORMATION

(75) Inventors: James F. Howell, Houston, TX (US); Robert L. Earthman, Jr., Houston, TX (US); Manmeet Singh, Houston, TX (US)

(73) Assignee: Ameritrade IP Company, Inc, Omaha, NE (US)

( * ) Notice: Subject to any disclaimer, the term of this patent is extended or adjusted under 35 U.S.C. 154(b) by 51 days.

This patent is subject to a terminal disclaimer.

(21) Appl. No.: 11/545,318

(22) Filed: Oct. 10, 2006

(65) Prior Publication Data

US 2007/0055615 A1 Mar. 8, 2007

Related U.S. Application Data

(63) Continuation of application No. 09/736,707, filed on Dec. 15, 2000, now Pat. No. 7,212,994.

(51) Int. Cl.
G06Q 40/00 (2006.01)

(52) U.S. Cl. ............................... 705/35; 705/37

(58) Field of Classification Search .................. None
See application file for complete search history.

(56) References Cited

U.S. PATENT DOCUMENTS

| | | | |
|---|---|---|---|
| 5,289,372 A | 2/1994 | Guthrie et al. | |
| 5,983,227 A | 11/1999 | Nazem et al. | |
| 6,182,224 B1 * | 1/2001 | Phillips et al. | 726/6 |
| 6,195,647 B1 | 2/2001 | Martyn et al. | |
| 6,278,982 B1 | 8/2001 | Korhammer et al. | |
| 6,317,727 B1 | 11/2001 | May | |
| 6,321,212 B1 | 11/2001 | Lange | |
| 6,347,307 B1 | 2/2002 | Sandhu et al. | |
| 2002/0073011 A1 * | 6/2002 | Brattain et al. | 705/37 |
| 2002/0107770 A1 * | 8/2002 | Meyer et al. | 705/36 |
| 2002/0165812 A1 * | 11/2002 | Lukose | 705/37 |

OTHER PUBLICATIONS

Investing: S.E.C. Watch; A Call from Levitt to Let the E.C.N.'s Trade, The New York Times, Oct. 31, 1999.

Troy Wolverton, Ameritrade Merges, Then Unloads, CNET News, Sep. 10, 2002.

Matthen Goldstein, Online Trading Gets Smarter, SmartMoney, Apr. 25, 2000.

Susan Pulliam and Dave Pettit, Direct Access Beckons Traders, But It's Best for Skilled Investors, The Wall Street Journal (WSJ.com), Mar. 26, 2000.

Carol Vinzant, The Long and Winding Road Warning: Delays Ahead, Fortune, Apr. 17, 2000.

Sutton, TradeCast to Offer Online Trading System.(Company Business and Marketing), Web Finance, Jan. 3, 2000, Great Neck, N.Y.

(Continued)

*Primary Examiner* — Olabode Akintola
(74) *Attorney, Agent, or Firm* — Bracewell & Giuliani LLP

(57) ABSTRACT

A system and method for real time dissemination of information is provided. One server receives and data bases the information while another server disseminates the information; instead of one server receiving the information, data basing the information, and dissemination the information to all users requesting the information.

20 Claims, 2 Drawing Sheets

OTHER PUBLICATIONS

Ivy Schmerken, Ameritrade Pares Systems to Boost Capabilities—Financial-Services Firm Consolidates to Focus Its Resources and Handle Growing Trade Volume, InformationWeek, Apr. 24, 2000, CMP Media Inc.

Bobby Earthman, Smart Software for Online Trading Cuts Out Middleman.(Brief Article), Houston Business Journal 30.41, Feb. 25, 2000.

Randall W. Forsyth, Direct Connections: Brokers That ByPass Browers Offer Advantages, But Also Hassles, Barron's, Apr. 17, 2000, p. 66, The Electronic Investor.

NYSE Opening Door for ECN Trading, Milwaukee Journal Sentinel, Dec. 5, 1999.

* cited by examiner

SYSTEM AND METHODS FOR DISSEMINATING REAL TIME INFORMATION

RELATED APPLICATIONS

This application is a continuation of and claims priority to and the benefit of U.S. patent application Ser. No. 09/736,707, filed on Dec. 15, 2000 now U.S. Pat. No. 7,212,994, titled "System and Methods for Disseminating Real Time Information," incorporated herein by reference in its entirety.

BACKGROUND OF THE INVENTION

1. Field of The Invention

The present invention generally relates to data processing. Particularly, the present invention relates to a system and methods for disseminating information.

2. Description of the Related Art

It has long been recognized that accesses to timely information regarding current conditions in various commodities and financial markets are essential to profitable trading and investment. Many complex investment strategies require precise and careful timing of specific transactions in response to fluctuating market conditions. This is particularly true in today's fast-moving markets where the ability to respond quickly to changing market conditions may mean the difference between substantial profits or devastating losses. Many investors rely heavily on real-time stock quotes when implementing their investment strategies, and most of those investors get their real-time stock quotes from a brokerage company. Thus, a successful brokerage company must be able to provide stock quotes as accurately and efficiently as possible.

Stock quotes are currently provided by stock exchanges, such as New York Stock Exchange, NASDAQ, etc., to a field vender such as Bloomberg or Comstock. After parsing the stock quote information received from the stock exchanges, the field vender then sends the stock quote information to a quote server at a rate of about 1,000 to 2,000 packets per second. The quote server is typically located at a regional brokerage office such as TradeCast or Merrill Lynch. The quote server has a database and keeps track of the history of each specific stock quote. If the stock quote is not in the database, the quote server adds the stock quote to the database. If the stock quote is already in the database, then the quote server updates the database. Next, the quote server checks to see if a registered user has requested that particular stock quote. Most brokerage companies use a subscription based system. If one workstation or trader registers a particular stock quote, then every time the tick or quote comes in, the trader gets an update on that stock quote. If numerous customers are requesting a stock quote at the same time, then the quote server will take some time to send the requested stock quotes to all the requesting customers. If the quote server spends more time delivering stock quotes, however, then the quote server must spend less time getting stock quotes. Thus, when the above-mentioned response time to the requesting customers takes too long, the quote server may miss some of the stock quotes sent by the field vender. As a result, investors may not have the most current stock quote information needed to make intelligent trading decisions.

Consequently, it would be desirable to provide an improved method to disseminate the information, e.g., deliver stock quotes, to investors in real-time.

SUMMARY OF THE INVENTION

In view of the foregoing, embodiments of the present invention provide an improved system and method to disseminate the information to investors in real-time. According to an embodiment of the present invention, a system for disseminating real time information is provided. The system includes a quote server positioned to receive stock quote information from a provider, e.g., field vender, etc., a contact server positioned to request a stock quote from the quote server in response to the stock quote request being requested by a user, means associated with the quote server and responsive to the stock quote request for sending a stock quote to the contact server, and means associated with the contact server for disseminating the stock quote received from the quote server to a plurality of users, e.g., trading stations requesting the respective stock quote.

In accordance with this embodiment of the system, quote information from a provider is received by a quote server. In response to a quote request from a user to a contact server, the contact server requests the quote request from the quote server. The quote server then sends a respective quote according to the quote request to the contact server. In turn, the contact server disseminates the quote to the user and two other users requesting the same quote information. By having to send the requested quote information only once, the quote server is able to spend more time in receiving quote information and less time in distributing the quote information. This can of the quote server readers the amount of time spent delivering stock quotes and help prevent missing stock quotes sent from the provider. Advantageously, the addition of the contact server in combination with the quote server enables the system to serve upwards of 1,000-2,000 people per combination of the quote and contact server.

According to another embodiment of the present invention, a stock quoting system is provided. The stock quoting system includes a quote server positioned to receive stock quote information from a provider, e.g., field vender, etc., a contact server positioned to request a stock quote request from the quote server in response to the stock quote request being requested by at least one user, means for sending a respective stock quote according to the stock quote request to the contact server by the quote server, and means for disseminating by the contact server the stock quote to a plurality of users, e.g., a plurality of trading stations requesting the respective stock quote.

Methods for disseminating stock quotes in real time are also provided. According to another embodiment of a method, the method includes the steps of receiving stock quote information from a provider by a quote server, and in response to a stock quote request from at least one user to a contact server, the contact server requesting the stock quote request from the stock quote server, and sending a respective stock quote according to the stock quote request to the contact server by the quote server. The method also includes the contact server, rather than the stock quote server, disseminating the stock quote to a plurality of users, e.g., a plurality of trading stations requesting the respective stock quote.

According to another embodiment of the method of disseminating stock quotes in real time, the method includes generating a plurality of stock quotes from a stock exchange, sending the plurality of stock quotes to a field vender, parsing the plurality of stock quotes, sending the plurality of stock quotes to a quote vender having a quote server at a relatively high rate of speed, and verifying validity of each of the plurality of stock quotes at the quote server. The method can also include adding a particular stock from the plurality of stock quotes to a database associated with the quote server when the particular stock is not in the database and updating the database with each of the plurality of stock quotes when the particular stock from the plurality of stock quotes is in the database. According to embodiment of the method, the quote server can be located, for example, in a regional stock brokerage office. Advantageously, the database is adapted to track history of each of the plurality of stock quotes. The method can also include determining when a contact server in communication with the quote server is requesting a particular stock quote, sending the particular stock quote to the contact server responsive to a request for the particular stock quote, and sending from the contact server the particular stock quote to a plurality of stock traders that each have requested the particular stock quote. The plurality of stock quotes can be positioned in one or more a data packets. As such, the method can also include multiplexing the plurality of data packets to the quote server at a rate of about 1,000 data packets per second or greater. As such, the method can include the quote server receiving the plurality of data packets at a rate in the range of about 1000-2000 data packets per second. Providing the user data at such a high rate allows users, e.g., stock traders, to make quick decisions related to the particular stock responsive to the respective stock trader receiving the particular stock quote.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. The present invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Figure 1:
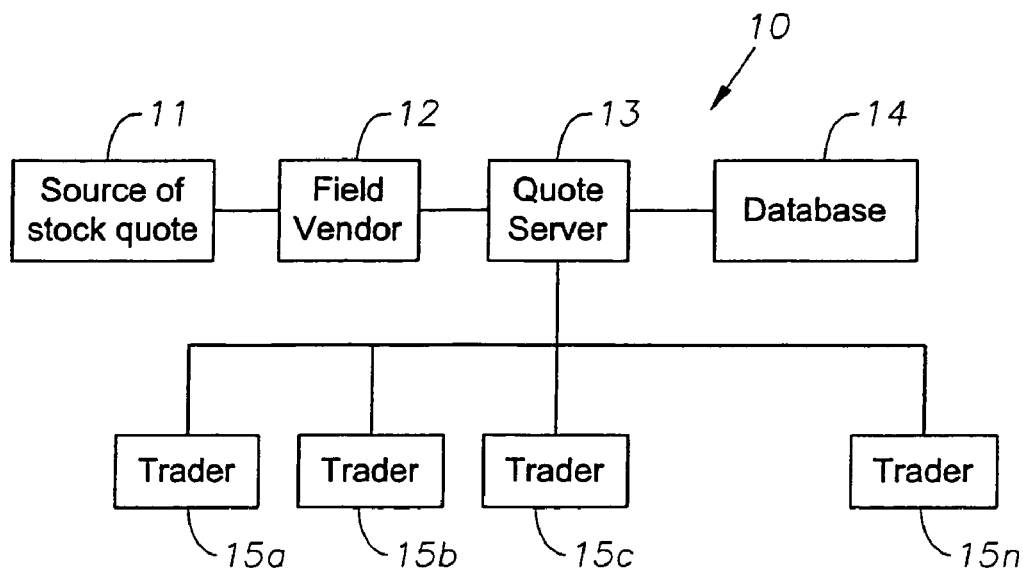
FIG. 1 is a block diagram of a stock quoting system according to the prior art.

FIG. 1 illustrates a block diagram of a stock quoting system according to the prior art. As shown, a stock quoting system 10 includes a quote server 13 and a database 14. Generally, stock quotes are sent from a source of stock quote 11 to a field vender 12 and then to quote server 13. Source of stock quote 11 are typically stock exchanges, such as the New York Stock Exchange, NASDAQ, etc. Field vender 12 is a trading vender such as Bloomberg or Comstock. Stock traders can request stock quotes from quote server via trading stations 15a-15n.

In response to a stock quote request, quote server 13 would send a stock quote to a corresponding one or more of trading stations 15a-15n. Because stock quoting system 10 is a closed system, quote server 13 has to finish sending stock quotes to trading stations 15a-15n before quote server 13 can perform other important functions such as reading data from field vender 12. In other words, if quote server 13 spends more time delivering stock quotes, then quote server 13 has to spend less time obtaining stock quotes. As a result, quote server 13 may miss a stock quote (or data packet) from field vender 12. Because quote server 13 does not have the most current stock quote, database 14 could not be updated, and a trader would not have the most current stock quote information needed to make intelligent trading decisions.

Figure 2:
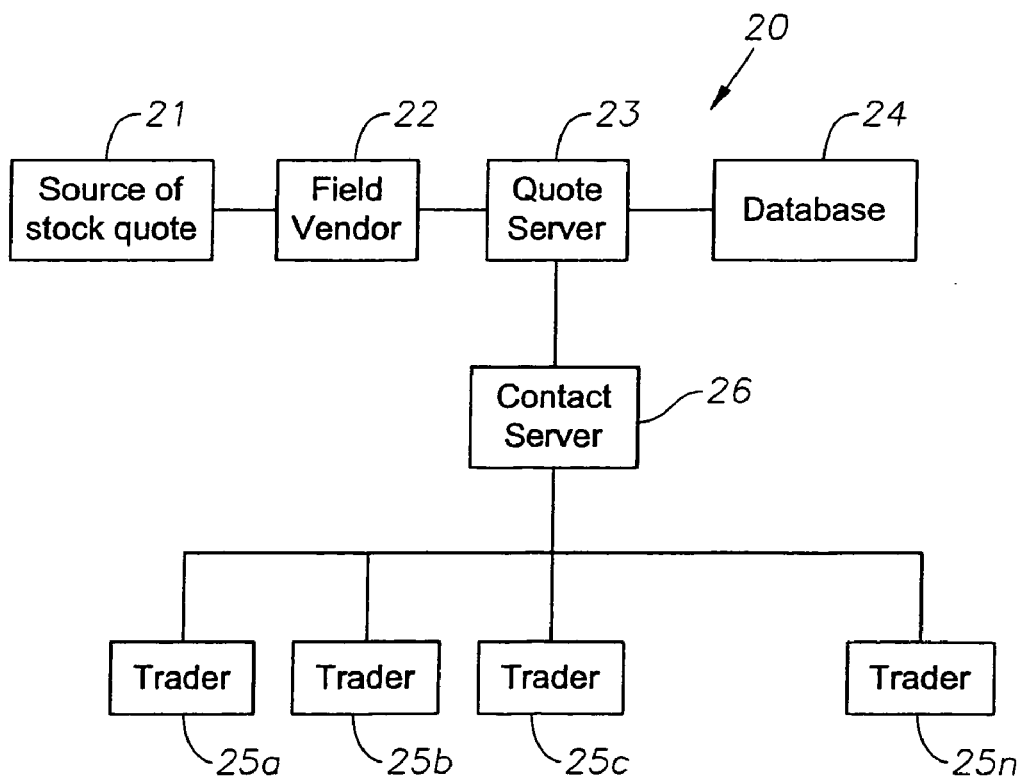
FIG. 2 is a block diagram of a stock quoting system in accordance with an embodiment of the present invention.

FIG. 2 illustrates a block diagram of a stock quoting system in accordance with a preferred embodiment of the present invention. As shown, a stock quoting system 20 includes a quote server 23, a database 24 and a contact server 26. Stock quotes are sent from a source of stock quote 21 to a field vender 22 and then to quote server 23. Source of stock quote 21 can be an exchange that generates stock quotes similar to source of stock quote 11 depicted in FIG. 1. Field vender 22 parsers the information and multiplexes it to quote server 23 at a rate of approximately 1,000-2,000 stock quotes (or packets) per second. Quote server 23 can be any type of server capable of receiving and transmitting information, and can be located in a regional brokerage office such as TradeCast or Merrill Lynch. Quote server 23 is coupled to database 24 that keeps track of the history of each specific stock quote. If a quote for a particular stock is not in database 24, quote server 23 can add the missing stock quote to database 24. If the stock quote is already in database 24, quote server 23 can update database 24 with the latest information. Stock traders can request stock quotes from contact server 26 via trading stations 25a-25n. Contact server 26 may be, for example, a workstation, a mid-range computer or a mainframe computer. In addition, contact server 26 may be coupled to a network such as a local-area network (LAN) or a wide-area network (WAN). In response to a stock quote request, contact server 26 would send a stock quote to a corresponding one or more of trading stations 25a-25n.

Figure 3:
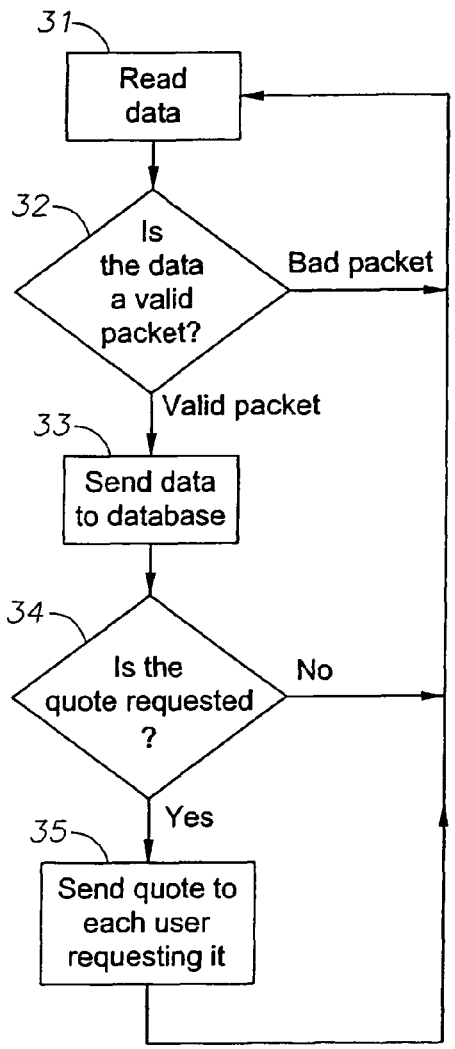
FIG. 3 is a flow chart of a stock quoting system according to the prior art.
Figure 4:
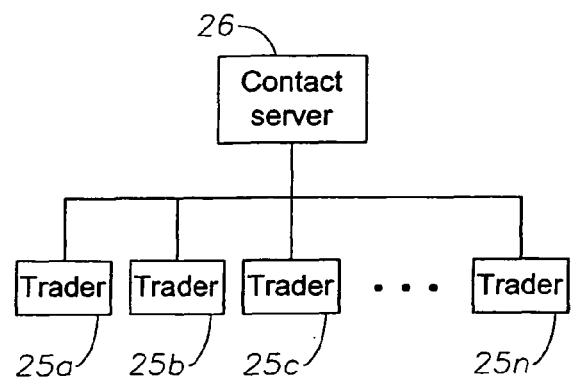
FIG. 4 is a flow chart of a method for delivering stock quotes in real-time utilizing the stock quoting system in FIG. 2, in accordance with an embodiment of the present invention.

FIG. 4 illustrates a flow chart of a method for delivering stock quotes in real-time utilizing stock quoting system 20, in accordance with an embodiment of the present invention. After data has been received by a quote server, as shown in block 31, a determination is made by the quote server 23 as to whether or not the received data is a valid packet, as depicted in block 32. If the received data is a valid packet, the received data will be stored in a database coupled to the quote server 23, as shown in block 33. Otherwise, the received data will be discarded or ignored. Then, the quote server 23 checks to see if a contact server 26 is requesting a particular stock quote, as shown in block 34. If the contact server 26 is requesting a stock quote, the quote server 23 sends the stock quote to the contact server 26, as depicted in block 36. The contact server 26 may send the stock quote to all traders 25a-25n who have requested that particular stock quote. If no trader 25a-25n has made a stock quote request, then the contact server 26 does not request any stock quote from the quote server 23. By comparison, FIG. 3 illustrates a flowchart according to the prior art where hundreds of traders 15a-15n would request a stock quote whereby quote server 13 would have to send each trader 15a-15n the stock quote, shown in steps 34 and 35.

As has been described, the present invention provides an improved method for delivering stock quotes in real-time. Because the quote server 23 sends a stock quote to the contact server 26 only when a stock quote request has been made from a trader 25a-25n via the contact server 26, the quote server 23v is not burdened with the responsibility of delivering stock quotes for each stock quote request. As such, the quote server 23 can dedicate more processing for receiving new stock quote information from a field vender 22.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs or other storage devices known to those skilled in the art including transmission type media such as analog or digital communications links.

This application is related to U.S. patent application Ser. No. 09/736,707, filed on Dec. 12, 2000, titled "System and Methods for Disseminating Real Time Information," incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the attached claims.

That claimed is:

1. A method for disseminating stock quotes in real time, the method comprising:
   receiving stock quote information from a provider by a quote server;
   in response to a stock quote request from at least one user to a contact server, the contact server requesting the stock quote request from the stock quote server;
   sending a respective stock quote according to the stock quote request to the contact server by the quote server; and
   disseminating the stock quote to a plurality of users by the contact server.

2. A method as defined in claim 1, wherein the provider is a field vender.

3. A method as defined in claim 1, wherein the plurality of users are a corresponding plurality of trading stations requesting the respective stock quote.

4. A method as defined in claim 3, further comprising determining by the quote server if the contact server is requesting a particular stock quote.

5. A method as defined in claim 4, wherein the contact server is a workstation.

6. A method as defined in claim 4, wherein a database is associated with the quote server, and the method further comprises tracking the history of each particular stock quote using the database.

7. A method as defined in claim 6, further comprising:
   receiving the particular stock quote;
   determining if the particular stock quote is in the database;
   adding the particular stock quote to the database if the particular stock quote is not in the database; and
   updating the database if the particular stock quote is already in the database.

8. A stock quoting system comprising:
   a quote server positioned to receive stock quote information from a provider;
   a contact server positioned to request a stock quote request from the quote server in response to the stock quote request being requested by at least one user;
   means for sending a respective stock quote according to the stock quote request to the contact server by the quote server; and
   means for disseminating the stock quote to a plurality of users by the contact server.

9. A stock quoting system of claim 8, wherein the provider is a field vender.

10. A stock quoting system of claim 8, wherein the contact server is a workstation.

11. A stock quoting system as defined in claim 8, wherein the plurality of users are a corresponding plurality of trading stations requesting the respective stock quote.

12. A stock quoting system as defined in claim 11, further comprising a database associated with the quote server and positioned to track the history of each particular stock quote, and wherein the quote server is further positioned to determine if the particular stock quote is in the database, add the particular stock quote to the database if the particular stock quote is not in the database, and update the database if the particular stock quote is already in the database.

13. A system for disseminating real time information comprising:
   a quote server positioned to receive stock quote information from a provider;
   a contact server positioned to request a stock quote from the quote server responsive to the stock quote request being requested by a user;
   means associated with the quote server and responsive to the stock quote request for sending a stock quote to the contact server; and
   means associated with the contact server for disseminating the stock quote received from the quote server to a plurality of users.

14. A system as defined in claim 13, wherein the provider is a field vender.

15. A system as defined in claim 13, wherein the contact server is a workstation, and wherein the plurality of users are a corresponding plurality of trading stations.

16. A system as defined in claim 13, further comprising a database associated with the quote server and positioned to track the history of each particular stock quote, and wherein the quote server further positioned to determine if the particular stock quote is in the database, add the particular stock quote to the database if the particular stock quote is not in the database, and update the database if the particular stock quote is already in the database.

17. A method of disseminating stock quotes in real time, the method comprising:
   generating a plurality of stock quotes from a stock exchange;
   sending the plurality of stock quotes to a field vender;
   parsing the plurality of stock quotes;
   sending the plurality of stock quotes to a quote vender at a relatively high rate of speed, the quote vender including a quote server;
   verifying validity of each of the plurality of stock quotes at the quote server;
   adding a particular stock from the plurality of stock quotes to a database associated with the quote server when the particular stock is not in the database, the database being adapted to track history of each of the plurality of stock quotes;

updating the database with each of the plurality of stock quotes when the particular stock from the plurality of stock quotes is in the database;

determining when a contact server in communication with the quote server is requesting a particular stock quote;

sending the particular stock quote to the contact server responsive to a request for the particular stock quote; and sending from the contact server the particular stock quote to a plurality of stock traders that each have requested the particular stock quote.

18. A method as defined in claim 17, wherein each of the plurality of stock quotes comprises a data packet, and wherein the method further comprises multiplexing the plurality of data packets to the quote server at a rate of about 21,000 data packets per second or greater.

19. A method as defined in claim 18, wherein the quote server is located in a regional stock brokerage office, and wherein the method further comprises the quote server receiving the plurality of data packets at a rate in the range of about 1000-2000 data packets per second.

20. A method as defined in claim 19, further comprising making a quick decision related to the particular stock by a stock trader responsive to the stock trader receiving the particular stock quote.

* * * * *